United States Patent [19]

Sammells et al.

[11] 4,437,954
[45] Mar. 20, 1984

[54] FUELS PRODUCTION BY PHOTOELECTROLYSIS OF WATER AND PHOTOOXIDATION OF SOLUBLE BIOMASS MATERIALS

[75] Inventors: Anthony F. Sammells, Naperville; Michael R. St. John, Chicago, both of Ill.

[73] Assignee: Institute of Gas Technology, Chicago, Ill.

[21] Appl. No.: 275,378

[22] Filed: Jun. 19, 1981

[51] Int. Cl.³ .................. C25B 1/04; C25B 15/08; B01J 19/08
[52] U.S. Cl. .................. 204/129; 204/157.1 R; 204/237; 204/239; 422/186
[58] Field of Search ........... 204/129, 157.1 W, 237, 204/239

[56] References Cited
U.S. PATENT DOCUMENTS
4,092,129 5/1978 Goudal .................. 204/129
4,094,751 6/1978 Nozik .................. 204/129

Primary Examiner—Howard S. Williams
Attorney, Agent, or Firm—Thomas W. Speckman

[57] ABSTRACT

A process and apparatus for production of fuels by photoelectrolysis of water and photooxidation of water soluble biomass and a process for preparation of Schottky-type metalized, appropriately doped n-type semiconductor photochemical diodes suitable for use in the above process and apparatus. The production of hydrogen by photoelectrolysis of water as the cathodic reaction of an optically illuminated photochemical diode is effected in an aqueous electrolyte which comprises a biomass product which may be monosaccharides, polysaccharides, lignins, their partially oxidized products, and mixtures thereof which are oxidized as the anodic reaction of the photochemical diode producing liquid fuels and useful chemicals. Molecular oxygen evolution is avoided and utilization of biomass product provides a cost effective material to increase fuels and useful chemical production by photoelectrolysis of water at potentials substantially less than required for normal water electrolysis involving oxygen evolution.

32 Claims, 3 Drawing Figures

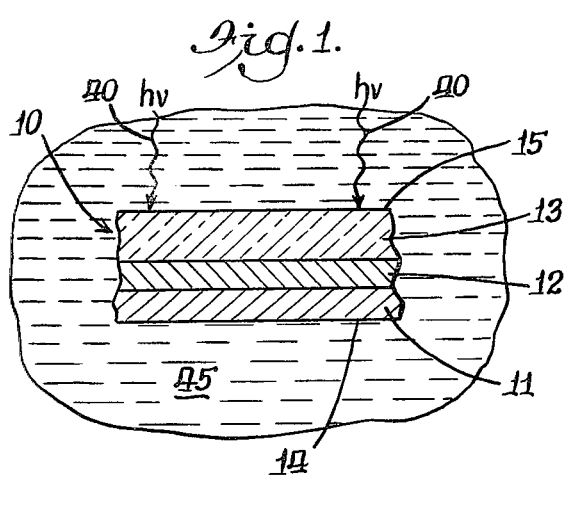
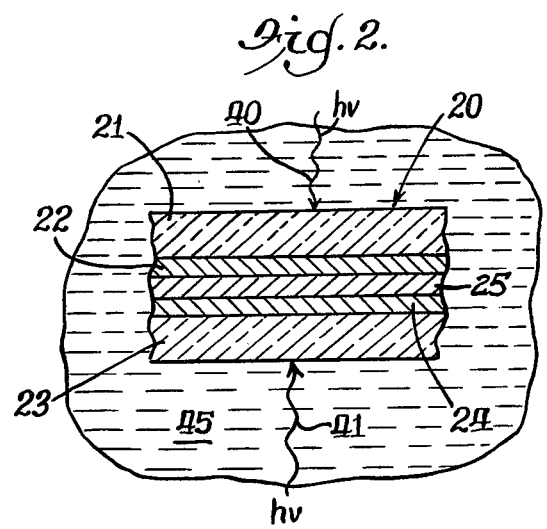
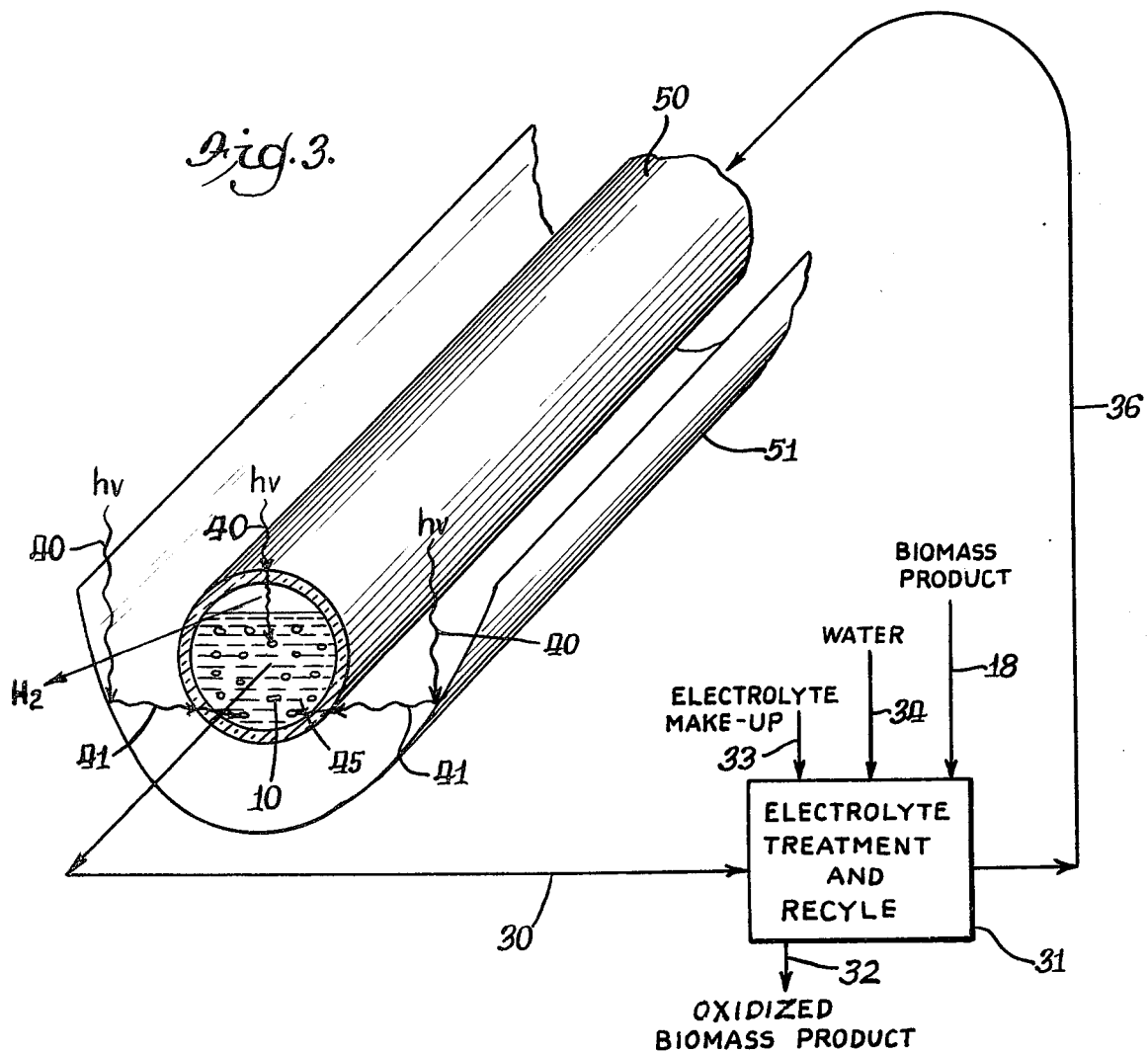

FUELS PRODUCTION BY PHOTOELECTROLYSIS OF WATER AND PHOTOOXIDATION OF SOLUBLE BIOMASS MATERIALS

BACKGROUND OF THE INVENTION

1. Field of the Invention

This invention relates to a process and apparatus for production of fuels by photoelectrolysis of water and photooxidation of water soluble biomass product. More particularly, this invention relates to production of hydrogen by photoelectrolysis of water as the cathodic reaction of an optically illuminated photochemical diode in contact with an electrolyte which comprises a biomass product which may be monosaccharides, polysaccharides, lignins, their partially oxidized products, and mixtures thereof which are oxidized as the anodic reaction of the photochemical diode producing liquid fuels and useful chemicals. Molecular oxygen evolution is avoided in the process of this invention. The process of this invention produces high purity hydrogen photoelectrolytically at potentials substantially less than required for normal water electrolysis involving oxygen evolution. The utilization of biomass product provides a cost effective material to increase fuels production by photoelectrolysis of water.

2. Description of the Prior Art

Photoelectrolysis of water by solar radiation has been proposed by several techniques as exemplified by U.S. Pat. Nos. 4,090,933 and 4,011,149 and references cited therein.

Photochemical diodes, in the form of Schottky-type diodes or p-n type diodes are taught by U.S. Pat. No. 4,094,751 to be useful to convert water into hydrogen plus oxygen (or hydrogen peroxide) and to convert hydrogen sulfide into hydrogen plus sulfur.

The electrolytic oxidation of dextrose in the manufacture of calcium gluconate is known as described in the article "Manufacture of Calcium Gluconate by Electrolytic Oxidation of Dextrose" by H. S. Isbell, Harriet L. Frush and F. J. Bates, Industrial and Engineering Chemistry, Vol. XXIV, No. 4, April 1932, pps. 375–378, wherein it is taught that $CaBr_2$ is necessary as a catalyst. U.S. Pat. No. 1,976,731 teaches the electrolytic oxidation of an aldose sugar in the presence of a halogen salt catalyst having atomic weight greater than chlorine. The article "Electrolytic Preparation of Calcium Gluconate and Other Salts of Aldonic Acids" by Colin G. Fink and Donald B. Summers, Transactions of the Electrochemical Society, 74, 625 (1938), teaches that alkali ferricyanide may be used as a substitute for the alkali bromide as a catalyst in the electrolytic preparation of calcium gluconate. The commercial processes for oxidation of sugars to acids are indirect oxidations, that is, the electrochemical reaction is reduction of bromine followed by a subsequent chemical oxidation reaction.

U.S. Pat. No. 4,089,761 teaches a sewage treatment process wherein oxygen for supply to aerobic microorganisms is produced at the anode of an electrolytic cell maintained in the biodigestion compartment of the sewage treatment cell with the cathode being isolated so as to vent hydrogen out of the cell.

The applicants are not aware of prior art wherein photochemical diodes are contacted by an aqueous electrolyte comprising biomass product which, upon exposure of the photochemical diodes to optical energy, produces molecular hydrogen and oxidized biomass product, both of which readily provide useful fuels. The production of molecular oxygen is avoided in the process of the present invention and the photochemical diodes having band gaps of less than about 2 eV are stabilized against corrosion.

SUMMARY OF THE INVENTION

This invention relates to a process and apparatus for production of fuels: hydrogen by photoelectrolysis of water and liquid fuels, such as alcohols and their predecessors, by photooxidation of biomass product. Other useful chemicals may be produced by oxidation of the biomass product according to the process of this invention, such as acids. Optically illuminated photochemical diodes are maintained in contact with an aqueous electrolyte comprising oxidizable biomass product to drive the desired reactions. The photochemical diodes, upon energy absorption of optical illumination, inject electrons at the cathode and holes at the anode into the electrolyte. As the anodic reaction, oxidizable biomass product selected from the group consisting of monosaccharides, polysaccharides, lignins, their partially oxidized products, and mixtures thereof, is oxidized producing an oxidized biomass product. As the cathodic reaction, molecular hydrogen is formed.

The anodic reaction may be written as Reaction I and the cathodic reaction may be written as Reaction II, as follows:

Reaction I

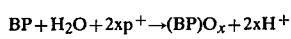
$$BP + H_2O + 2xp^+ \rightarrow (BP)O_x + 2xH^+$$

wherein BP represents oxidizable biomass product selected from the group consisting of monosaccharides, polysaccharides, lignins, their partially oxidized products, and mixtures thereof.

Reaction II

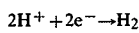
$$2H^+ + 2e^- \rightarrow H_2$$

Reactions I and II as set forth above express a simplified summary expression of the overall reactions. While we do not wish to be restricted to reaction mechanisms, which are not yet entirely known, due to the very close spatial proximity, there appears to be possible interaction between the cathodic and anodic reactions, their intermediates and products. The above reaction system operates at lower than conventional energy requirements for the electrolytic production of hydrogen by changing the electrochemical reaction and avoiding the formation of molecular oxygen. The energy requirements for electrolytic production of hydrogen and oxidation of the biomass product is less than oxygen production from water. The oxidizable biomass product decomposition potential is more negative than the semiconductor and therefore serves to stabilize the photochemical diodes, particularly those having bandgaps less than 2 eV which are most suitable for solar spectrum absorption.

Accordingly, it is an object of this invention to provide a proces and apparatus for fuels production by photoelectrolysis of water and photooxidation of biomass product such as monosaccharides, polysaccharides, lignins, and their partially oxidized products.

Another object of this invention is to provide a process for high purity hydrogen production by water electrolysis which avoids molecular oxygen evolution.

Yet another object of this invention is to provide a process for hydrogen production by water electrolysis involving direct electrochemical oxidation of cost effective oxidizable organic material.

Still another object of this invention is to provide a process for increased fuels or other useful chemical production by electrochemical oxidation of oxidizable biomass product to a liquid fuel or liquid fuel predecessor or a useful chemical concurrently with production of molecular hydrogen from water.

Another object of this invention is to provide a process for production of hydrogen by photoelectrolysis of water while stabilizing the photochemical diodes used in the process.

These and other objects, advantages and features of this invention will be apparent from the description taken together with the drawings describing preferred embodiments in detail.

BRIEF DESCRIPTION OF THE DRAWINGS

The drawings schematically show preferred embodiments of the process and apparatus of this invention wherein:

FIG. 1 illustrates a Schottky-type photochemical diode for use in this invention;

FIG. 2 illustrates a p-n type photochemical diode for use in this invention; and FIG. 3 illustrates one embodiment of an apparatus according to this invention.

DESCRIPTION OF THE PREFERRED EMBODIMENTS

The process for fuels production of this invention results in the production of molecular hydrogen fuel by photoelectrolysis of water and in an alcohol fuel or its chemical predecessor or other useful chemical by concurrent photooxidation of biomass product. According to the process, an aqueous electrolyte comprising oxidizable biomass product selected from the group consisting of monosaccharides, polysaccharides, lignins, their partially oxidized products, and mixtures thereof, is passed in contact with a plurality of solid photochemical diodes of the type selected from the group consisting of Schottky-type metallized appropriately doped p-type semiconductor, Schottky-type metallized appropriately doped n-type semiconductor, appropriately doped p-n type semiconductors, and mixtures thereof. When the semiconductor portion(s) of the photochemical diodes are optically illuminated with optical energy at a wavelength appropriate for the band gap of the semiconductor, hydrogen is produced as the cathodic reaction and oxidized biomass product is produced as the anodic reaction. The oxidizable biomass product utilized in the process of this invention is oxidized at a more cathodic potential than molecular oxygen production from water, thereby obviating molecular oxygen formation. Molecular hydrogen may be readily removed from the electrolyte and from the process in high purity and without the danger of ignition which is present in mixtures of hydrogen and oxygen. The oxidized biomass product, which may be a mixture of products of various degrees of oxidation, may be removed from the electrolyte and fresh soluble oxidized biomass product introduced to the electrolyte for recycle to the process.

Photochemical diodes suitable for use in the process and apparatus of this invention are those of the type which comprise an appropriately doped semiconductor material of a specified conductivity type and provided with an ohmic contact and intimately joined through the ohmic contact to a metal portion or an appropriately doped semiconductor material having a conductivity type opposite to the first portion. In cases of the Schottky-type diode, the ohmic contact and metal portion may be the same. FIG. 1 shows a schematic representation of a Schottky-type photochemical diode 10 in electrolyte 45. Appropriately doped semiconductor layer 13 is in contact with one face of ohmic contact 12 which makes contact through its opposite face with metallic layer 11. The semiconductor may be of either p- or n-type conductivity. Absorption of optical energy 40 in the semiconductor layer creates electrons and holes. When the n-type semiconductors are used, the electrons move across the ohmic contact through the metal layer and pass from the metal surface 14 to the electrolyte producing a cathodic reaction. Holes are transferred across the semiconductor surface 15 to the electrolyte to produce an anode reaction. When semiconductor 13 is a p-type semiconductor, the charge flows reverse.

Appropriately doped p-n type photochemical diodes may also be used in the process and apparatus of this invention. FIG. 2 schematically illustrates a p-n type photochemical diode 20 capable of accepting optical energy 40 and 41 from opposite directions. P-type semiconductor 21 is in contact with ohmic contact 22 and n-type semiconductor 23 is in contact with ohmic contact 24. The ohmic contacts may be connected through metal-support contact 25. The appropriately doped p-n type semiconductor photochemical diodes may be in different physical configurations, that is, they may be side by side, spherical and the like.

It is seen that both a cathodic reaction and an anodic reaction are produced when the photochemical diodes are in contact with an electrolyte comprising materials susceptible to chemical reduction and chemical oxidation. Preferred appropriately doped p-type semiconductors for use in this invention are those consisting essentially of at least one p-doped material selected from the group consisting of Si, GaP, GaAs, InP, $CuInS_2$ and $Cu_2O$. Preferred appropriately doped n-type semiconductors for use in this invention are those consisting essentially of at least one n-doped material selected from the group consisting of Si, CdS, $TiO_2$, GaP, GaAs, CdSe, InP, $MoS_2$, $MoSe_2$, $Fe_2O_3$, $CuInS_2$, $WO_3$, $CdWO_4$ and $ZnWO_4$.

The photochemical diodes generally taught by U.S. Pat. No. 4,094,751 illustrate the type of photochemical diodes suitable for use in the process and apparatus of this invention. As recognized by that patent, smaller band gap semiconductors absorb more sunlight and therefore provide higher efficiency providing the energy necessary for the production of hydrogen by decomposition of water through use of the optical energy of visible light. However, the semiconductor materials having small band gaps, less than 2 eV, which are most suitable for visible solar spectrum absorption are susceptible to corrosion by competition with oxygen evolution and will self-destruct. It is an important feature of the present invention to provide an oxidizable biomass product which oxidizes more cathodically than oxygen production and will, therefore, stabilize the semiconductor of the photochemical diode. Further, we have found that semiconductors which have a flat band potential not sufficiently negative to evolve hydrogen in water, such as $TiO_2$, will, in the presence of oxidizable biomass product, such as glucose, according to this invention produce hydrogen.

The photochemical diodes used in the process and apparatus of this invention form a solution or suspension in the electrolyte. The particle size of the photochemical diode may be varied over a large range. For example, when the photochemical diodes have an average particle size less than about 0.01 micrometer they may form a solution of approaching molecular sized diodes in the electrolyte; when they have an average particle size of about 0.01 to about 0.25 micrometer they form a colloidal suspension in the electrolyte; and when they have an average particle size about 0.25 to 1 millimeter they may be suspended in the electrolyte by agitation. Photochemical diodes having an average particle size about 0.01 micrometer to about 1 millimeter are preferred for use in this invention. Suitable concentration of the photochemical diodes in the electrolyte for use in the process and apparatus of this invention is about 0.1 to about 5 weight percent, based upon the volume of the electrolyte which is subjected to optical illumination, about 0.5 to about 1 weight percent being preferred. The above concentrations are based upon the volume of the electrolyte being optically illuminated due to the photochemical diodes generally being restricted to presence in that volume, while a substantially larger volume of electrolyte is present in the overall system, including electrolyte treatment and recycle volumes.

The aqueous electrolyte for use in the process and apparatus of this invention may vary over wide ranges of concentration and may be aqueous solutions of acids, bases or inorganic salts. The concentration of these solutions is determined primarily by the desired oxidized product of the biomass material and the stability against corrosion of the semiconductor material. When strong acid electrolytes, such as 1.0 M sulfuric acid, are used methane production is enhanced, while at pH's of about 4 and more basic hydrogen production is enhanced. The electrolyte may comprise an aqueous inorganic salt, acid or base providing ionic concentrations of about 0.05 to about 10 Molar. Preferred acids are selected from the group consisting of hydrochloric, sulfuric, perchloric and phosphoric. Preferred bases are selected from the group consisting of sodium hydroxide and potassium hydroxide. Preferred inorganic salts are selected from the group consisting of sodium chloride, potassium chloride and sodium sulfate. The electrolytes may be buffered to maintain the desired pH and oxidized product distribution. The electrochemical hydrogen production does not appear to be dependent upon specific electrolytes. We have found especially preferred electrolytes are those having a pH of about 4 to about 7.5. Aqueous electrolytes other than those specifically set forth above may be used.

One of the important features of this invention is the use of electrolyte comprising oxidizable biomass product selected from the group consisting of monosaccharides, polysaccharides, lignins, their partially oxidized products, and mixtures thereof for reaction as the anodic reaction. This avoids molecular oxygen evolution, reduces the energy requirements for photoelectrolytic product of hydrogen, and protects the photochemical diodes most suitable for use in the optical solar energy spectra from self-destruction. Monosaccharides are well known to the derivable from natural biomass materials produced by growing plants such as cellulose and hemicellulose. For example, rum distillate wastes, waste products of sugar production, such as bagasse, and other materials as described in By-Products of the Cane Sugar Industry, by J. M. Paturau, publ. Elsevier, New York, 1969, are suitable. Any oxidizable monosaccharide is suitable for use in this invention including the hexoses and pentoses such as glucose, fructose, arabinose and xylose. Polysaccharides may be used directly in the process of this invention. Polysaccharides readily available, such as cellulose and starch, are particularly suitable. Any lignin having an oxidizable functional group is satisfactory for use in this invention, such as alkali lignins obtained by acidification of an alkaline extract of wood and those obtained from other treatments of cellulosic fibers. Thus, it is seen that the oxidizable biomass product used for this invention represents readily available and economic biomass products which are readily renewable. For example, glucose, a preferred monosaccharide, and polysaccharides, may be readily derived from biomasses such as municipal wastes, agricultural wastes and forest product wastes, while lignins, such as alkaline lignins may be derived from kraft pulping effluents. The oxidizable biomass product may be partially oxidized, such as including some acid radicals.

Suitable concentration of the oxidizable biomass product in the electrolyte of the anode zone is about 10 to about 600 grams/liter, preferably about 100 to 200 grams/liter.

FIG. 3 schematically illustrates the process and apparatus of this invention. Suitable photochemical diodes 10 are suspended in electrolyte 45 flowing through optically transparent pipe 50. The electrolyte flowing through pipe 50 is an aqueous electrolyte comprising an oxidizable biomass product as defined above. Optical solar energy may impinge directly upon the photochemical diode as shown by line 40, or may be reflected by any suitable means 51 as shown by lines 41 to provide greater optical energy absorption by the photochemical diodes. Upon absorption of the optical energy by photochemical diodes 10, hydrogen and oxidized biomass product is produced by the cathodic and anodic reactions, respectively, of the photochemical diode. Molecular hydrogen and $CO_2$ may be produced and hydrogen readily separated from the $CO_2$ by means well known to the art, such as membrane separation. The gases may be readily removed from the electrolyte either within tube 50 or at any point up to and including electrolyte treatment and recycle means 31. Tube 50 preferably has filter or membrane ends allowing passage of the electrolyte, biomass product and oxidized biomass product while retaining photochemical diodes within the optical energy exposure volume. Means for retention of the photochemical diodes within the optically illuminated volume of tube 50 are apparent to one skilled in the art upon reading of this disclosure. Electrolyte comprising oxidized biomass product is passed from the optically illuminated volume of tube 50 by conduit 30 to electrolyte treatment and recycle mean 31 wherein the oxidized biomass product may be withdrawn through oxidized biomass product discharge conduit 32. Electrolyte make-up conduit 33 provides for adjustment of the electrolyte to desired pH upon addition of water through conduit 34 and oxidizable biomass product through conduit 18. Electrolyte treatment and recycle means 31 provides regeneration of the electrolyte for recycle by conduit 36 to the optical llumination volume within pipe 50 and may include suitable pumping means, mixing means and separation means as required by the photochemical reaction taking place in the system. Heating means or other temperature adjustment means may be provided to maintain the optically illuminated electrolyte and low chemical diodes at somewhat higher than ambient temperatures to promote the electrochemical oxidation of the organic material. It is preferred to maintain the temperature of the electrolyte in contact with the optically illuminated photochemical diode at about 65° to about 90° C. Suitable materials and specific designs and configurations for construction of the apparatus of this invention will be apparent to one skilled in the art upon reading of this disclosure.

One of the important features of this invention is the enhanced rate of production of hydrogen by photoelectrolysis of aqueous biomass product. This is achieved by producing hydrogen as the cathodic reaction and producing oxidized biomass as the anodic reaction of the photochemical diode, the oxidation of the biomass product occurring at more negative electrochemical potential than the production of molecular oxygen. The utilization of a process involving oxidation of biomass product at energies of between about 1.1 to about 3.3 eV permits use of photochemical diodes comprising semiconductors having small band gaps which are more efficient in the absorption of solar optical energies. Yet another important feature of this invention is the production of useful chemicals and fuels by the photooxidation of water soluble biomass products according to this invention. Oxidation of monosaccharides, polysaccharides and their partially oxidized products and mixtures thereof according to this invention may directly produce as principal products alcohols and polyalcohols useful for fuels and carboxylic and polycarboxylic acids which may be used directly as useful chemicals or readily converted to fuels. Oxidation of lignins and their partially oxidized products may directly produce useful chemicals such as phenols and substituted phenols.

According to an embodiment of our invention, Schottky-type metallized appropriately doped n-type semiconductor photochemical diodes may be prepared by first preparing a colloidal metal sol by thermal decomposition of a metal hydrogen acid followed by ion exchange removal of halide ion, and then mixing appropriately doped n-type semiconductor material with the colloidal metal sol and subjecting the mixture to an ultrasonic field of frequencies commonly used for ultrasonic cleaning for a period of time sufficient to deposit the metal on the n-type semiconductor material and evaporating to dryness forming solid photochemical diodes. The metal most frequently used is platinum in the form of chloroplatinic acid. Any of the appropriately doped n-type semiconductor materials disclosed above may be used, $TiO_2$ being particularly suitable.

The following examples show specific detailed embodiments of our invention and are intended to be exemplary and not to limit our invention in any way.

EXAMPLE I

Photochemical diodes of the Schottky metallized n-type semiconductor were prepared according to the present invention and for use in the process of this invention. $TiO_2$ obtained from Baker Chemical Company, having the anatase crystal structure and particle size of 2.5 microns or less diameter, was made suitable for semiconductor use by introduction of crystal defects by heating at 650° C. under a hydrogen atmosphere 8 hours.

Colloidal platinum was prepared by thermal decomposition of chloroplatinic acid ($H_2PtCl_6$). 250 ml of $9.76 \times 10^{-4}$ Molar $H_2PtCl_6$ was mixed with 85 ml 0.034 Molar Monosodium Citrate and heated at 90° C. for about 12 hours until absorbance of the solution at 450 nM was about 5.0. The ions remaining in solution were removed by passing the solution through a bed of Amberlite MB 3 ion exchange resin until a $AgNO_3$ test indicated substantially no chloride ion was present. The solution then contained colloidal platinum suitable for diode preparation.

100 mg of $TiO_2$ as prepared above was mixed with 250 ml of the colloidal platinum as prepared above. The mixture was placed in an ultrasonic bath at frequencies commonly used for ultrasonic cleaning for 30 minutes. The solid photochemical diode was obtained by evaporation of the mixture to dryness in an oven at 60° to 80° C.

EXAMPLE II

Photoelectrolysis of water and photooxidation of water soluble glucose was performed by mixing 100 mg of Pt/n-$TiO_2$ Schottky-type metalized doped n-type semiconductor solid photochemical diodes prepared as described in Example I with an aqueous electrolyte of 20 ml 0.50 Molar $NaH_2PO_4$ and 10.8 gms glucose. The mixture was placed in a pyrex flask submersed in a water bath in a pyrex container. A temperature of 60°±5° C. was maintained in the electrolyte which was constantly stirred to maintain the photochemical diodes in suspension. The electrolyte and flask were purged with high priority nitrogen for 10 minutes.

The photochemical diodes maintained in suspension in the electrolyte were irradicated with light from a mercury lamp provided with filtering to yield light at a wavelength of 366 nM and an intensity of 7 mW/cm$^2$. Evolved gas was collected with the rate of gas evolution in the first 24 hours at 1.1 ml/hr. The composition of the evolved gas was found to be 92 mole percent hydrogen and 8 mole percent carbon dioxide.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. A process for fuels production by photoelectrolysis of water and photooxidation of water soluble biomass product avoiding molecular oxygen evolution comprising:

passing an aqueous electrolyte comprising oxidizable biomass product selected from the group consisting of monosaccharides, polysaccharides, lignins, their partially oxidized products, and mixtures thereof in contact with both electrodes of a plurality of solid photochemical diodes of the type selected from the group consisting of Schottky-type metalized appropriately doped p-type semiconductor, Schottky-type metalized appropriately doped n-type semiconductors, appropriately doped p-n type semiconductors, and mixture thereof, said oxidizable biomass product oxidizing more cathodically than oxygen and having a decomposition potential more negative than said semiconductor;

optically illuminating said semiconductor portion(s) of said photochemical diodes producing hydrogen as the cathodic reaction of said photochemical diode and producing oxidized biomass product as the anodic reaction of said photochemical diode;

removing molecular hydrogen from said electrolyte; and separately removing oxidized biomass product from said electrolyte.

2. The process of claim 1 wherein said appropriately doped p-type semiconductor consists essentially of at least one p-doped material selected from the group consisting of Si, GaP, GaAs, InP, $CuInS_2$ and $Cu_2O$.

3. The process of claim 1 wherein said appropriately doped n-type semiconductor consists essentially of at least one n-doped material selected from the group consisting of Si, CdS, $TiO_2$, GaP, GaAs, CdSe, InP, $MoS_2$, $MoSe_2$, $Fe_2O_3$, $CuInS_2$, $WO_3$, $CdWO_4$ and $ZnWO_4$.

4. The process of claim 1 wherein said optical illumination is provided by solar radiation.

5. The process of claim 1 wherein said biomass product comprises monosaccharide.

6. The process of claim 5 wherein said monosaccharide comprises glucose.

7. The process of claim 5 wherein said monosaccharide has a concentration of about 10 to about 600 grams/liter in said aqueous electrolyte.

8. The process of claim 7 wherein said monosaccharide concentration is about 100 to about 200 grams/liter.

9. The process of claim 1 wherein said biomass product comprises polysaccharide.

10. The process of claim 9 wherein said polysaccharide comprises starch.

11. The process of claim 9 wherein said polysaccharide comprises cellulose.

12. The process of claim 9 wherein said polysaccharide has a concentration of about 10 to about 600 grams/liter in said aqueous electrolyte.

13. The process of claim 9 wherein said polysaccharide concentration is about 100 to about 200 grams/liter.

14. The process of claim 1 wherein said biomass product comprises lignin.

15. The process of claim 14 wherein said lignin has a concentration of about 10 to about 600 grams/liter in said aqueous electrolyte.

16. The process of claim 15 wherein said lignin concentration is about 100 to about 200 grams/liter.

17. The process of claim 1 wherein said electrolyte is selected from the group consisting of aqueous acids, bases and inorganic salts providing ionic concentrations of about 0.05 to about 10 Molar.

18. The process of claim 17 wherein said acid is selected from the group consisting of hydrochloric, sulfuric, perchloric and phosphoric.

19. The process of claim 17 wherein said inorganic salt is selected from the group consisting of sodium chloride, potassium chloride and sodium sulfate.

20. The process of claim 17 wherein said base is selected from the group consisting of sodium hydroxide and potassium hydroxide.

21. The process of claim 17 wherein said electrolyte has a pH of about 4 to about 7.5.

22. The process of claim 1 wherein said electrolyte is maintained at temperatures about 65° to about 90° C.

23. The process of claim 1 wherein said diodes have an average particle size less than about 0.01 micrometer and form a solution of molecular-sized diodes in said electrolyte.

24. The process of claim 1 wherein said diodes have an average particle size about 0.1 to about 0.25 micrometer and form a colloidal suspension in said electrolyte.

25. The process of claim 1 wherein said diodes have an average particle size about 0.25 micrometer to about 1 millimeter and are suspended in said electrolyte.

26. The process of claim 1 wherein said diodes have an average particle size about 0.01 micrometer to about 1 millimeter and are suspended in said electrolyte.

27. The process of claim 26 wherein said diodes are in a concentration of about 0.1 to about 5 weight percent, based upon volume of said electrolyte being optically illuminated.

28. The process of claim 27 wherein said concentration is about 0.5 to about 1 weight percent, based upon volume of said electrolyte being optically illuminated.

29. The process of claim 1 wherein said diodes are in a concentration of about 0.1 to about 5 weight percent, based upon volume of said electrolyte being optically illuminated.

30. The process of claim 29 wherein said concentration is about 0.5 to about 1 weight percent, based upon volume of said electrolyte being optically illuminated.

31. The process of claim 1 wherein said doped semiconductor photochemical diodes have band gaps less than 2 eV.

32. The process of claim 1 wherein said diodes are Pt/n-$TiO_2$ Schottky-type metalized doped n-type semiconductor photochemical diodes.

* * * * *